(12) United States Patent
Chen et al.

(10) Patent No.: US 11,912,433 B2
(45) Date of Patent: Feb. 27, 2024

(54) DUAL-FILTER-BASED TRANSFER ALIGNMENT METHOD UNDER DYNAMIC DEFORMATION

(71) Applicant: SOUTHEAST UNIVERSITY, Jiangsu (CN)

(72) Inventors: Xiyuan Chen, Nanjing (CN); Ping Yang, Nanjing (CN); Lin Fang, Nanjing (CN); Junwei Wang, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 397 days.

(21) Appl. No.: 17/275,506

(22) PCT Filed: Apr. 15, 2020

(86) PCT No.: PCT/CN2020/084846
§ 371 (c)(1),
(2) Date: Mar. 11, 2021

(87) PCT Pub. No.: WO2020/233290
PCT Pub. Date: Nov. 26, 2020

(65) Prior Publication Data
US 2022/0033100 A1 Feb. 3, 2022

(30) Foreign Application Priority Data
May 17, 2019 (CN) .......................... 201910413535.4

(51) Int. Cl.
*B64D 45/00* (2006.01)
*G01C 21/16* (2006.01)

(52) U.S. Cl.
CPC ............ *B64D 45/00* (2013.01); *G01C 21/16* (2013.01); *B64D 2045/0085* (2013.01)

(58) Field of Classification Search
CPC . B64D 45/00; B64D 2045/0085; G01C 21/16
See application file for complete search history.

(56) References Cited

U.S. PATENT DOCUMENTS 5,082,207 A * 1/1992 Tulinius .................... B64C 3/44
244/76 R
6,127,970 A * 10/2000 Lin ......................... G01S 19/23
342/357.31
(Continued)

FOREIGN PATENT DOCUMENTS

CN 102621565 A 8/2012
CN 103913181 A * 7/2014 ............. G01C 21/20
(Continued)

OTHER PUBLICATIONS

Gong et al. "Multi-Node Transfer Alignment Based on Mechanics Modeling for Airborne DPOS", IEEE Sensors Journal, vol. 18, No. 2, Jan. 15, 2018, pp. 669-679.

*Primary Examiner* — Luis A Martinez Borrero
(74) *Attorney, Agent, or Firm* — ArentFox Schiff LLP; Michael Fainberg

(57) ABSTRACT

A dual-filter-based transfer alignment method under dynamic deformation. A dynamic deformation angle generated under dynamic deformation and a coupling angle between dynamic deformation and body motion will reduce the accuracy of transfer alignment; and a transfer alignment filter is divided into two parts, the first part estimates a bending deformation angle and the coupling angle, and uses an attitude matching method, and the second part estimates a dynamic lever arm, and uses a "speed plus angular speed" matching method.

5 Claims, 3 Drawing Sheets

(56) References Cited

U.S. PATENT DOCUMENTS

| | | | | |
|---|---|---|---|---|
| 6,408,245 B1* | 6/2002 | An | G01S 19/47 | 701/472 |
| 6,510,354 B1* | 1/2003 | Lin | G05B 13/0275 | 706/900 |
| 6,735,523 B1* | 5/2004 | Lin | G01S 19/23 | 701/472 |
| 6,970,773 B2* | 11/2005 | Phillips | B64C 3/52 | 701/3 |
| 7,307,585 B2* | 12/2007 | Hinnant, Jr. | G01S 19/14 | 342/357.22 |
| 8,160,770 B2* | 4/2012 | Goupil | G05B 17/02 | 702/191 |
| 8,838,298 B2* | 9/2014 | Hinnant | G01C 21/165 | 701/4 |
| 8,880,242 B2* | 11/2014 | Hinnant, Jr. | G01P 15/00 | 701/34.2 |
| 9,746,392 B2* | 8/2017 | Hinnant, Jr. | G01M 5/0016 | |
| 10,062,831 B2* | 8/2018 | Hasan | G01M 5/0066 | |
| 10,099,774 B2* | 10/2018 | Provost | B64D 45/00 | |
| 10,137,999 B2* | 11/2018 | Nelson | G08B 21/187 | |
| 10,215,836 B2* | 2/2019 | Yoon | G01S 5/06 | |
| 10,401,154 B2* | 9/2019 | Pitt | G01B 11/16 | |
| 10,989,539 B1* | 4/2021 | Frey, Jr. | G01C 21/18 | |
| 11,084,601 B2* | 8/2021 | Abe | B64D 45/00 | |
| 11,725,947 B2* | 8/2023 | Frey, Jr. | G01C 23/00 | 701/301 |
| 2002/0059027 A1* | 5/2002 | An | G01V 11/00 | 702/2 |
| 2003/0102411 A1* | 6/2003 | Kota | B64C 3/48 | 244/219 |
| 2003/0234324 A1* | 12/2003 | Kubica | B64C 13/16 | 244/195 |
| 2004/0176887 A1* | 9/2004 | Kent | G07C 5/008 | 701/29.5 |
| 2004/0243360 A1* | 12/2004 | Niedermeier | G06F 30/00 | 703/1 |
| 2005/0065727 A1* | 3/2005 | Hu | G01S 19/44 | 342/358 |
| 2005/0151029 A1* | 7/2005 | Tracy | B64C 3/50 | 244/215 |
| 2007/0018054 A1* | 1/2007 | Enzinger | G05D 1/0066 | 244/195 |
| 2007/0096979 A1* | 5/2007 | Hinnant | G01S 19/14 | 342/357.22 |
| 2007/0124038 A1* | 5/2007 | Goupil | G05B 23/0254 | 701/31.1 |
| 2010/0033350 A1* | 2/2010 | Papineau | G01G 19/07 | 340/963 |
| 2010/0076624 A1* | 3/2010 | Hinnant, Jr. | G01M 5/0016 | 701/4 |
| 2011/0313614 A1* | 12/2011 | Hinnant, Jr. | G07C 5/0808 | 701/33.9 |
| 2015/0203211 A1* | 7/2015 | Wu | G01M 7/00 | 701/14 |
| 2017/0254877 A1* | 9/2017 | Yoon | G01S 5/0264 | |
| 2021/0262801 A1* | 8/2021 | Frey, Jr. | G01C 21/20 | |

FOREIGN PATENT DOCUMENTS

| | | | | |
|---|---|---|---|---|
| CN | 104165640 A | * | 11/2014 | G01C 25/005 |
| CN | 104567930 A | * | 4/2015 | G01C 25/005 |
| CN | 104567930 A | | 4/2015 | |
| CN | 108413887 A | | 8/2018 | |
| CN | 109724624 A | | 5/2019 | |
| CN | 110371318 A | | 10/2019 | |
| EP | 2634534 A2 | | 2/2013 | |

* cited by examiner

DUAL-FILTER-BASED TRANSFER ALIGNMENT METHOD UNDER DYNAMIC DEFORMATION

CROSS-REFERENCE TO RELATED APPLICATIONS

This application is the U.S. National Stage Application of International Patent Application No. PCT/CN2020/084846, filed on Apr. 20, 2020, which claims priority to Chinese Patent Application No. 201910413535.4, filed on May 17, 2019, the contents of each of which is incorporated herein by reference in its entirety.

TECHNICAL FIELD

The present invention belongs to the technical field of inertial navigation, and relates to measurement of wing deformation of an aircraft by utilizing an inertial navigation system, wherein the present invention relates to a process of calibration for a low-precision inertial navigation subsystems by means of a high-precision main inertial navigation system, and particularly relates to a transfer alignment method based on dual filters under dynamic deformation.

BACKGROUND

The bearing capacity of an aircraft, especially the wing part, is limited. Therefore, the measurement of the dynamic deformation of the wings of an aircraft has strict requirements on the weight and size of the measuring apparatus. However, the measurement accuracy of an IMU unit is proportional to the weight and size of the IMU unit. Therefore, it is impossible to install a high-precision IMU at each of the loads.

At present, for measurement of the deformation of the wings of an aircraft, a high-precision POS is installed on the fuselage, while low-precision IMU units are installed on the wings, and the high-precision position and attitude information of the positioning points are acquired through transfer alignment between the main system and the subsystems. However, the additional speed, angular speed, and angle caused by flexural deformation between the main system and the subsystems are major factors affecting the measurement accuracy. The existing schemes of measurement of the dynamic deformation of the wings of an aircraft treat the wings as rigid bodies and take no account of the flexural deformation thereof. As a result, the accuracy of transfer alignment is unsatisfactory.

SUMMARY

Object of the Invention: in view of the drawbacks in the prior art, the present invention aims to provide a transfer alignment method based on dual filters under dynamic deformation, which performs geometric modeling and mathematical analysis on the error angle and angular speed caused by the coupling between fuselage movement and dynamic deformation during the transfer alignment process for measurement of the dynamic deformation of the wings of an aircraft, derives expressions for coupling angle and angular speed, and divides the transfer alignment filter into two parts: the first part estimates the flexural deformation angle and coupling angle with an attitude matching method; the second part estimates the dynamic lever arm with a "speed +angular speed" matching method. With such a design, the time of the transfer alignment process is shortened while the transfer alignment accuracy is improved.

Technical Solution: to attain the object described above, the present invention employs the following technical scheme:

A transfer alignment method based on dual filters under dynamic deformation, applied in an aircraft wing deformation measurement system, in which a main inertial navigation system is installed in a cabin and inertial navigation subsystems are installed on the wings, wherein the method comprises the following steps:

(1) generating attitude, speed and position information of the main inertial navigation system and outputs of three gyros and three accelerometers by using a trajectory generator, simulating flexural deformation angle $\vec{\theta}$ and flexural deformation angular speed $\vec{\dot{\theta}}$ between the main inertial navigation system and the inertial navigation subsystems by using a second-order Markov, carrying out geometric analysis on the flexural deformation, and deriving an expression of coupling angle $\Delta \vec{\phi}$ resulted from dynamic deformation of the carrier and movement of the carrier;

(2) using the flexural deformation angle, the flexural deformation angular speed and the coupling angle as state quantities, and establishing a model of filter 1 with an attitude matching method;

(3) establishing a dynamic lever arm model by using the flexural deformation angle and the coupling angle estimated in step (2), and deriving an expression of speed error and an expression of angular speed error;

(4) establishing a model of filter 2 by using the expression of speed error and expression of angular speed error derived in step (3) with a "speed+angular speed" matching method, estimating the initial attitude error of the inertial navigation subsystems, and using this error for initial attitude calibration of the inertial navigation subsystems, so as to accomplish a transfer alignment process.

Furthermore, in step (1), the geometrical analysis on the flexural deformation is carried out and the expression of coupling angle $\Delta \vec{\phi}$ resulted from the dynamic deformation of the carrier and movement of the carrier is derived as follows:

$$\Delta \vec{\phi} = M \vec{\omega}_\theta,$$

wherein, $\vec{\omega}_\theta = \vec{\dot{\theta}}$, and M is expressed as:

$$M = \begin{bmatrix} 0 & 0 & -\dfrac{1}{\omega_{isy}^{s'}} \\ -\dfrac{1}{\omega_{isz}^{s'}} & 0 & 0 \\ 0 & -\dfrac{1}{\omega_{isx}^{s'}} & 0 \end{bmatrix},$$

wherein, $\omega_{isx}^{s'}$, $\omega_{isy}^{s'}$ and $\omega_{isz}^{s'}$ represent the ideal angular speeds of the inertial navigation subsystems in east, north, and sky directions respectively.

Furthermore, in step (2), the flexural deformation angle, the flexural deformation angular speed, and the coupling angle are used as state quantities and the model of filter 1 is established with an attitude matching method as follows:

The state quantities of the filter 1 are selected as follows:

$$x_1 = [\delta\vec{\phi}\ \vec{\epsilon}^s\ \vec{\rho}_0\ \vec{\theta}\ \dot{\vec{\theta}}\ \Delta\vec{\phi}]^T,$$

wherein, $\delta\vec{\phi}$ represents attitude error, $\vec{\epsilon}^s$ represents zero drift of gyro measurement in the subsystem, and $\vec{\rho}_0$ represents initial installation angle error between the main system and the subsystem;

The state equation of filter 1 is:

$$\dot{x}_1 = F_1 x_1 + G_1 w_1,$$

wherein, $F_1$ represents the state transition matrix of filter 1, $G_1$ represents the system noise distribution matrix of filter 1, $w_1$ represents the system noise of filter 1, the state transition matrix $F_1$ is expressed as:

$$F_1 = \begin{bmatrix} (-\vec{\omega}_{in}^n \times) & -C_{s'}^n & 0_{3\times3} & 0_{3\times3} & 0_{3\times3} & 0_{3\times3} \\ 0_{3\times3} & 0_{3\times3} & 0_{3\times3} & 0_{3\times3} & 0_{3\times3} & 0_{3\times3} \\ 0_{3\times3} & 0_{3\times3} & 0_{3\times3} & 0_{3\times3} & 0_{3\times3} & 0_{3\times3} \\ 0_{3\times3} & 0_{3\times3} & 0_{3\times3} & 0_{3\times3} & 0_{3\times3} & 0_{3\times3} \\ 0_{3\times3} & 0_{3\times3} & 0_{3\times3} & 0_{3\times3} & I_{3\times3} & 0_{3\times3} \\ 0_{3\times3} & 0_{3\times3} & 0_{3\times3} & B_1 & B_2 & 0_{3\times3} \\ 0_{3\times3} & 0_{3\times3} & 0_{3\times3} & F_{64} & F_{65} & 0_{3\times3} \end{bmatrix},$$

wherein, $\vec{\omega}_{in}^n$ represents the rotation of the navigation system with respect to the inertial system, $\vec{\omega}_{in}^n \times$ represents an antisymmetric matrix, $-C_{s'}^n$ represents a transformation matrix between the ideal coordinate system of the subsystem and the navigation coordinate system, and $$B_1 = \begin{bmatrix} 0 & -2\beta_y & 0 \\ 0 & 0 & -2\beta_z \\ -2\beta_x & 0 & 0 \end{bmatrix}$$

$$B_2 = \begin{bmatrix} 0 & -\beta_y^2 & 0 \\ 0 & 0 & -\beta_z^2 \\ -\beta_x^2 & 0 & 0 \end{bmatrix},$$

$$\beta_i (i = x, y, z)$$

represent the coefficients of the second-order Markov model in east, north, and up directions, $F_{64} = MB_2$, $F_{65} = MB_1$;

The system measurement equation is:

$$y_1 = H_1 x_1 + \mu_1,$$

wherein, $y_1$ represents the difference between the true value of attitude and the estimated value from the filter, $H_1$ represents the measurement matrix of the filter 1, and $\mu_1$ represents the measurement noise in the filter 1.

Furthermore, the expression of speed error and the expression of angular speed error derived in step (3) are as follows:
The expression of angular speed error is as follows:

$$\Delta\vec{\omega} = (\vec{\omega}_{im}^m \times)\vec{\phi} + (\vec{\omega}_{im}^m \times)\Delta\vec{\phi} + A(\vec{\omega}_\theta)\vec{u}_{is}^s - A(\vec{\omega}_\theta)\left[\left(\frac{\pi}{1}U - \Delta\vec{\phi}\right)\times\right]\vec{u}_{is}^s,$$

wherein, $\vec{\omega}_{im}^m$ represents the angular speed of the main system in the coordinate system of the main system, $\vec{\phi}$ represents the ideal error angle between the main system and the subsystem, $A(\vec{\omega}_0)$ represent an amplitude matrix, $\vec{\mu}_{is}^s$ represents the identity matrix in the direction of $\vec{\omega}_{is}^s$, and $\vec{\omega}_{is}^s$ represents the angular speed of the subsystem under the coordinate system of the subsystem, $U=[1\ 1\ 1]^T$;

The expression of speed error is as follows:

$$\delta\dot{\vec{v}} = -(2\vec{\omega}_{ie}^n + \vec{\omega}_{en}^n)\times\delta\vec{v} + R_0 B_2\vec{\theta} + (2(\vec{\omega}_{im}^n\times)R_0 + R_0 B_1)\dot{\vec{\theta}} + C_s^n \vec{\nabla}^s + R_0\Delta\ddot{\vec{\phi}} + [(\vec{\omega}_{im}^n\times)(\vec{\omega}_{im}^n\times) + (\dot{\vec{\omega}}_{im}^n\times)]\delta\vec{r} + (f_s^n\times)\Delta\vec{\phi} + [(\vec{\omega}_{im}^n\times)(\vec{\omega}_{im}^n\times) + (\dot{\vec{\omega}}_{im}^n\times)]\vec{r}_0,$$

wherein, $\vec{\omega}_{ie}^n$ represents the rotation of the navigation system caused by the rotation of the earth, $\vec{\omega}_{en}^n$ represents the rotation of the navigation system caused by the curvature of the surface of the earth as the subsystem moves on the surface of the earth, $\delta\vec{v} = \vec{v}_n^n - \vec{v}_m^n$, $\vec{v}_m^n$ and $\vec{v}_s^n$ represent the speed vectors of the main system and the subsystem in the navigation coordinate system, $\vec{\theta}$ represents the flexural deformation angle between the main inertial navigation system and the inertial navigation subsystem, $\Delta\vec{\phi}$ represents the coupling angle between the main inertial navigation system and the inertial navigation subsystem, $\vec{\omega}_{im}^n$ represents the angular speed of the main system in the navigation coordinate system, $-C_s^n$ represents the transformation matrix between the subsystem and the navigation coordinate system, $\vec{\nabla}^s$ represents the zero bias of accelerometer measurement of the subsystem, $-f_s^n$ represents the specific force of the subsystem in the navigation coordinate system, $\delta\vec{r}$ represents dynamic lever arm, $\vec{r}_0 = [x_0\ y_0\ z_0]^T$ represents static lever arm, $x_0\ y_0\ z_0$ represent static lever arms in east, north, and up directions respectively, and $R_0$ can be expressed as:

$$R_0 = \begin{bmatrix} 0 & z_0 & 0 \\ 0 & 0 & x_0 \\ y_0 & 0 & 0 \end{bmatrix}.$$

Furthermore, in step (4), the model of filter 2 is established with a "speed+angular speed" matching method, the equation of measurement quantities is established by using the expression of speed error and the expression of angular speed error derived in step (3), and a Kalman filter model is established as follows:

The state quantities of the Kalman filter 2 are selected as follows:

$$x_2 = [\delta\vec{v}\ \vec{\nabla}^s\ \vec{\theta}\ \dot{\vec{\theta}}\ \delta\vec{r}]^T,$$

wherein, $\delta\vec{v}$ represents the speed error, and $\vec{\nabla}^s$ represents the zero bias of accelerometer measurement of the subsystem;

The state equation of the filter is:

$$\dot{x}_2 = F_2 x_2 + G_2 w_2,$$

wherein, $G_2$ represents the system noise distribution matrix of filter 2, $w_2$ represents the system noise of filter 2, and the state transition matrix $F_2$ is expressed as:

$$F_2 = \begin{bmatrix} F_{11} & C_s^n & F_{13} & F_{14} & F_{15} \\ 0_{3\times3} & 0_{3\times3} & 0_{3\times3} & 0_{3\times3} & 0_{3\times3} \\ 0_{3\times3} & 0_{3\times3} & 0_{3\times3} & I_{3\times3} & 0_{3\times3} \\ 0_{3\times3} & 0_{3\times3} & B_2 & B_2 & 0_{3\times3} \\ 0_{3\times3} & 0_{3\times3} & F_{53} & F_{54} & 0_{3\times3} \end{bmatrix},$$

wherein, $F_{11} = -[(2\vec{\omega}_{ie}^n + \vec{\omega}_{en}^n) \times]$, $F_{13} = R_0 B_2 + R_0 M(B_1 B_2 + B_2)$,
$F_2 = (2(\vec{\omega}_{im}^n \times)R_0 + R_0 B_1) + R_0 M B_1^2$, $F_{15} = [(\vec{\omega}_{im}^n \times)(\vec{\omega}_{im}^n \times) (\vec{\omega}_{im}^n \times)]$, $F_{53} = R_0 M B_2$,
$F_{54} = R_0 + R_0 M B_1$, and the system measurement equation is as follows:

$y_2 = H_2 x_2 + \mu_2$, wherein, $y_2$ represents the difference between the true value of speed or angular speed and the estimated value from the filter, $\mu_2$ represents the measurement noise in the filter 2, and $$H_2 = \begin{bmatrix} I_{3\times3} & 0_{3\times3} & 0_{3\times3} & 0_{3\times3} & 0_{3\times3} \\ 0_{3\times3} & 0_{3\times3} & (\vec{\omega}_{im}^n \times) & I_{3\times3} & 0_{3\times3} \end{bmatrix}.$$

Beneficial effects: compared with the prior art, the present invention takes account of the carrier movement and the error of coupling of rigid movement and dynamic elastic deformation between the main system and the subsystems, performs spatial geometric modeling and mathematical analysis on the angle and angular speed errors between the main system and the subsystems under dynamic elastic deformation, obtains the coupling angle error between the main system and the subsystems under dynamic deformation, thereby derives an expression of angular speed error between the main system and the subsystems under dynamic deformation, and employs dual filters based method, with both filters operating synchronously and merging in the last step; on one hand, the conventional transfer alignment process takes no account of the coupling error between dynamic deformation and fuselage movement, therefore the transfer alignment accuracy can't meet the requirement for high-accuracy transfer alignment; on the other hand, the conventional transfer alignment process employs a 24-dimensional filter and involves large amounts of computation; in contrast, the present invention performs geometric analysis on the coupling angle between the main system and the subsystems, obtains an expression of the coupling angle, and divides the state quantities into two groups and goes on in two filters synchronously, respectively. With such a design, the time of the transfer alignment process is shortened while the transfer alignment accuracy is improved.

DETAILED DESCRIPTION OF THE EMBODIMENTS

Hereunder the present invention will be further detailed in specific embodiments, with reference to the accompanying drawings.

Figure 1:
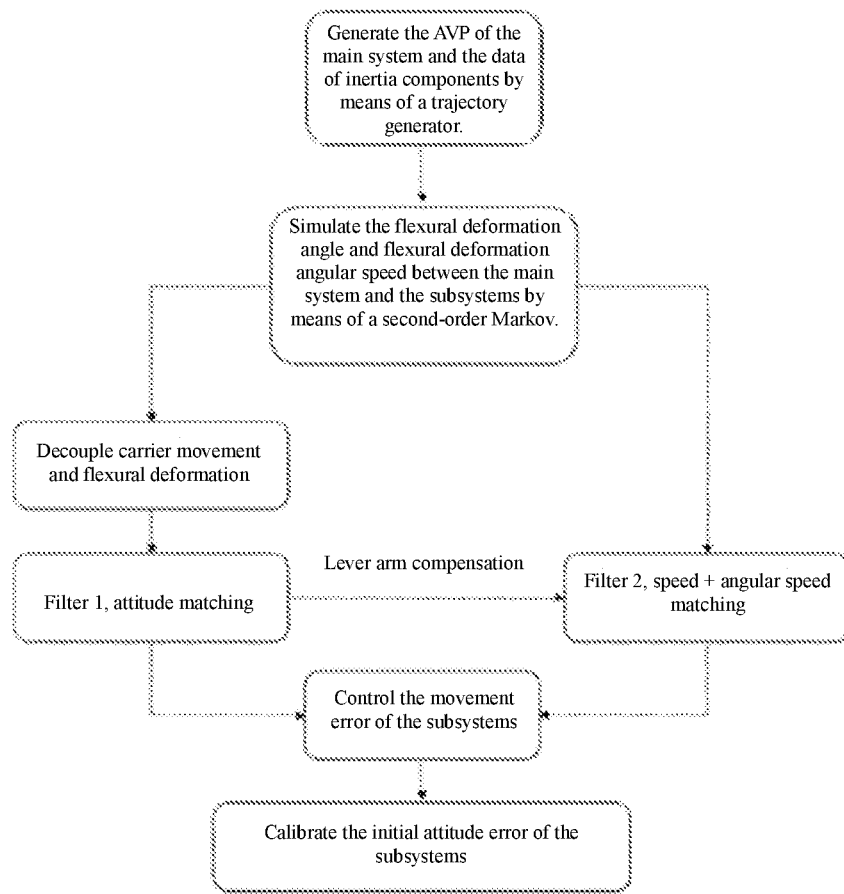
FIG. 1 is a flow chart of the transfer alignment based on dual filters according to the present invention.
Figure 2:
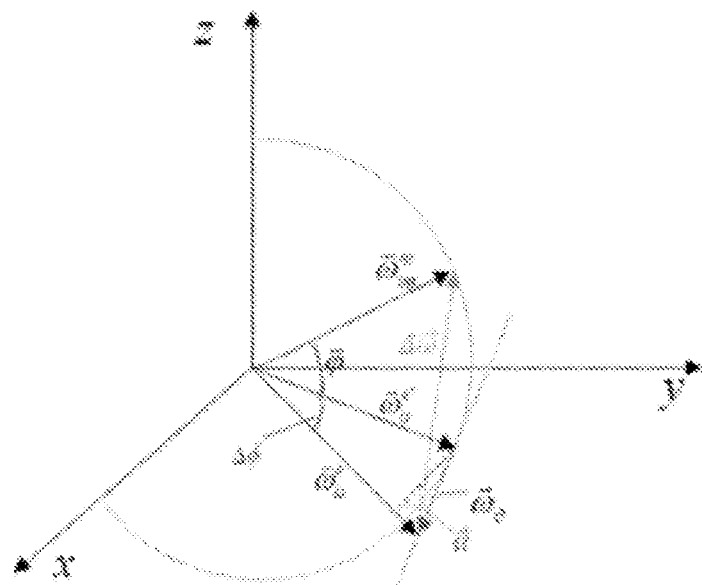
FIG. 2 is a schematic diagram of the spatial relationship between angular speed vector and additional dynamic flexural angular speed vector.

As shown in FIG. 1, the transfer alignment method based on dual filters under dynamic deformation proposed in an embodiment of the present invention uses a trajectory simulator to simulate the attitude, speed and position of the main system of the aircraft and the output data of the inertia components, and uses a second-order Markov to simulate and output the flexural deformation angle $\vec{\theta}$ and flexural deformation angular speed $\vec{\dot{\theta}}$ between the main system and the subsystems; it decouples the carrier movement and flexural deformation to obtain a coupling angle, and uses the coupling angle as a state quantity of filter 1, and uses an attitude matching method; the filter 2 utilizes the result of the filter 1 to compensate the lever arm error, and uses a speed+angular speed matching method. Hereunder detailed analysis is provided:

Step 1: generating attitude, speed and position information of the main inertial navigation system and outputs of inertia components (gyros and accelerometers) by using a trajectory generator, simulating flexural deformation angle $\vec{\theta}$ and flexural deformation angular speed $\vec{\dot{\theta}}$ between the main inertial navigation system and the inertial navigation subsystems by using a second-order Markov, carrying out geometric analysis on the flexural deformation, and deriving the coupling angle $\Delta\vec{\phi}$ between the main system and the subsystems resulted from dynamic deformation of the main system and the subsystems, wherein the flexural deformation angle $\vec{\theta}$ between the main system and the subsystems may be expressed by a second-order Markov as follows:

$\vec{\ddot{\theta}} = -2\beta\vec{\dot{\theta}} - \beta^2 \vec{\theta} + \vec{\omega}$, wherein, $\beta = 2.146/\tau$, $\tau$ represents correlation time, $\bar{\omega}$ represents Gaussian white noise, and the ideal error angle vector $\vec{\omega}$ between the main system and the subsystem is expressed as:

$\vec{\omega}_{is}^{s'} = C_m^{s'}(\vec{\phi})\vec{\omega}_{im}^m$ $\vec{\phi} = \vec{\phi}_0 + \vec{\theta}$, wherein, $\vec{\omega}_{is}^{s'}$ represents the gyro output of the subsystem in ideal state, $\vec{\omega}_{im}^m$ represents the gyro output of the main system, $C_m^{s'}(\vec{\phi})$ represents the attitude matrix between the main system and the subsystem, $\vec{\phi}_0$ represents the initial installation error angle vector of the main system, $\vec{\theta}$ represents the flexural deformation angle, additional angular speed $\vec{\omega}_\theta$ is generated under dynamic flexural deformation, and may be expressed as $\vec{\omega}_\theta = \vec{\dot{\theta}}$; then, as shown in FIG. 2, the angular speed output $\vec{\omega}_{is}^s$ of the subsystem in the actual state may be expressed as:

$\vec{w}_{is}^s = \vec{\omega}_{is}^{s'} + \vec{\omega}_\theta$.

The coupling error angle vector $\Delta\vec{\phi}$ between the main system and the subsystem caused by the flexural deformation coupling angular speed is:

$$\Delta\vec{\phi}=[\Delta\phi_x\ \Delta\phi_y\ \Delta\phi_z]^T.$$

The subscript x, y, z represent east, north and up directions respectively, $\Delta\vec{\phi}$ represents the coupling error angle between the main system and the subsystem caused by the flexural deformation coupling angular speed, i.e., the included angle between $\vec{\omega}_{is}^{s}$ and $\vec{\omega}_{is}^{s'}$, if $\vec{\omega}_{is}^{s'}=[\omega_{isx}^{s'}\ \omega_{isy}^{s'}\ \omega_{isz}^{s'}]^T$, $\vec{\omega}_\theta=[\omega_{\theta x}\ \omega_{\theta y}\ \omega_{\theta z}]^T$, then:

$$\vec{\omega}_{is}^{s'}=[\omega_{isx}^{s'}+\omega_{\theta x}\ \omega_{isy}^{s'}+\omega_{\theta y}\ \omega_{isz}^{s'}+\omega_{\theta z}]^T.$$

Figure 3:
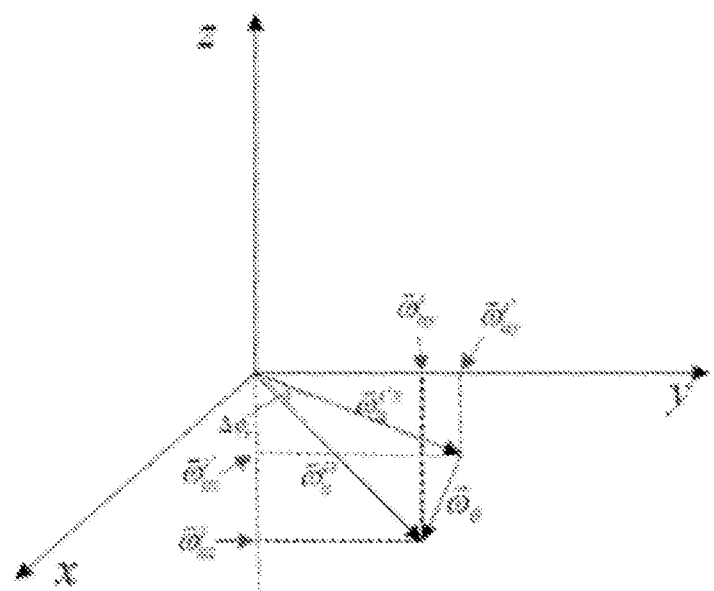
FIG. 3 is a schematic diagram of the coupling angle (projected to the yoz plane) between the main inertial navigation system and the inertial navigation subsystems under dynamic deformation.

As shown in FIG. 3, based on the geometrical relationship:

$$\begin{cases}\Delta\phi_x = \arctan\dfrac{\omega_{isz}^{s'}+\omega_{\theta z}}{\omega_{isy}^{s'}+\omega_{\theta y}} - \arctan\dfrac{\omega_{isz}^{s'}}{\omega_{isy}^{s'}}\\ \Delta\phi_y = \arctan\dfrac{\omega_{isx}^{s'}+\omega_{\theta x}}{\omega_{isz}^{s'}+\omega_{\theta z}} - \arctan\dfrac{\omega_{isx}^{s'}}{\omega_{isz}^{s'}}\\ \Delta\phi_z = \arctan\dfrac{\omega_{isy}^{s'}+\omega_{\theta y}}{\omega_{isx}^{s'}+\omega_{\theta x}} - \arctan\dfrac{\omega_{isy}^{s'}}{\omega_{isx}^{s'}}\end{cases}$$

The arctan function is expanded with Taylor series, and the high-order terms are omitted, then:

$$\Delta\phi=M\omega_\theta=M\dot\theta,$$

wherein, M may be expressed as:

$$M=\begin{bmatrix}0 & 0 & -\dfrac{1}{\omega_{isy}^{s'}}\\ -\dfrac{1}{\omega_{isz}^{s'}} & 0 & 0\\ 0 & -\dfrac{1}{\omega_{isx}^{s'}} & 0\end{bmatrix};$$

Step 2: using the flexural deformation angle, the flexural deformation angular speed and the coupling angle as state quantities, and establishing a model of filter 1 with an attitude matching method, as follows:

The state quantities of the filter 1 are selected as follows:

$$x_1=[\delta\vec{\phi}\ \vec{\varepsilon}^s\ \vec{\rho}_0\ \vec{\theta}\ \vec{\dot\theta}\ \Delta\vec{\phi}]^T,$$

wherein, $\delta\vec{\phi}$ represents attitude error, $\vec{\varepsilon}^s$ represents zero drift of gyro measurement in the subsystem, and $\vec{\rho}_0$ represents initial installation angle error between the main system and the subsystem;

The state equation of filter 1 is:

$$\dot x_1=F_1 x_1+G_1 w_1,$$

wherein, $F_1$ represents a state transition matrix, $G_1$ represents a system noise distribution matrix, $w_1$ represents system noise, and, according to the coupling angle model obtained in step (1), the state transition matrix $F_1$ may be expressed as:

$$F_1=\begin{bmatrix}(-\vec{\omega}_{in}^n\times) & -C_{s'}^n & 0_{3\times3} & 0_{3\times3} & 0_{3\times3} & 0_{3\times3}\\ 0_{3\times3} & 0_{3\times3} & 0_{3\times3} & 0_{3\times3} & 0_{3\times3} & 0_{3\times3}\\ 0_{3\times3} & 0_{3\times3} & 0_{3\times3} & 0_{3\times3} & 0_{3\times3} & 0_{3\times3}\\ 0_{3\times3} & 0_{3\times3} & 0_{3\times3} & 0_{3\times3} & I_{3\times3} & 0_{3\times3}\\ 0_{3\times3} & 0_{3\times3} & 0_{3\times3} & B_1 & B_2 & 0_{3\times3}\\ 0_{3\times3} & 0_{3\times3} & 0_{3\times3} & F_{64} & F_{65} & 0_{3\times3}\end{bmatrix},$$

wherein, $\vec{\omega}_{in}^n$ represents the rotation of the navigation system with respect to the inertial system, $\vec{\omega}_{in}^n\times$ represents an antisymmetric matrix, $C_s^n$ represents a transformation matrix between the ideal coordinate system of the subsystem and the navigation coordinate system, and $$B_1=\begin{bmatrix}0 & -2\beta_y & 0\\ 0 & 0 & -2\beta_z\\ -2\beta_x & 0 & 0\end{bmatrix}$$

$$B_2=\begin{bmatrix}0 & -\beta_y^2 & 0\\ 0 & 0 & -\beta_z^2\\ -\beta_x^2 & 0 & 0\end{bmatrix},$$

$$\beta_i(i=x,y,z)$$

represent the coefficients of the second-order Markov model in x, y, and z directions, $F_{64}=MB_2$, $F_{65}=MB_1$;

The system measurement equation is:

$$y_1=H_1 x_1+\mu_1,$$

wherein, $y_1$ represents the difference between the true value of attitude and the estimated value from the filter; $H_1$ represents the measurement matrix, see the document "Multi-mode Transfer Alignment based on Mechanics Modeling for Airborne DPOS, IEEE Sensors Journal, 2017, DOI: 10.1109/JSEN.2017.2771263" for the specific expression of the matrix H; $\mu_1$ represents the measurement noise in the filter 1;

Step 3: deriving an expression of speed error and an expression of angular speed error, as follows:

The angular speed difference $\Delta\vec{\omega}$ between the main system and the subsystem may be expressed as:

$$\Delta\vec{\omega}=\vec{\omega}_{is}^{s'}-\vec{\omega}_{im}^m$$

$$\Delta\vec{\omega}=\vec{\omega}_{is}^{s'}+\vec{\omega}_\theta-\vec{\omega}_{im}^m,$$

wherein, the coupling error angle vector between the main system and the subsystem is $\Delta\vec{\phi}$, then the transformation matrix between the main system and the subsystem may be expressed as $C_m^{s'}(100+\Delta\vec{\phi})$, and the error angular speed between the main system and the subsystem may be expressed as:

$$\Delta\vec{\omega}=C_m^{s'}(\vec{\phi}+\Delta\vec{\phi})\vec{\omega}_{im}^m+\vec{\omega}'_\theta-\vec{\omega}_{im}^m,$$

wherein, $\vec{\omega}'_\theta$ is the projection of $\vec{\omega}_{is}^{s'}$ on $\vec{\omega}_{is}^s$; since the rotating vector $(\vec{\phi}+\Delta\vec{\phi})$ from the main system to the subsystem is a small quantity, then:

$$[(\vec{\phi}+\Delta\vec{\phi})\times]=I-C_m^{s'}(\vec{\phi}+\Delta\vec{\phi}).$$

Therefore:

$$\Delta\vec{\omega}=\vec{\omega}'_\theta=[(\vec{\phi}+\Delta\vec{\phi})\times]\vec{\omega}_{im}^m,$$

wherein, $[(\vec{\varphi}+\Delta\vec{\varphi})\times]$ represents an antisymmetric matrix, and $\vec{\omega}'_\theta$ is:

$$\vec{\omega}'_\theta = A(\vec{\omega}_\theta)T(\vec{\alpha})\vec{\mu}_{is}^s,$$

wherein, $A(\vec{\omega}_\theta)$ represents an amplitude matrix, $\vec{\mu}_{is}^s$ represents the unit matrix in the direction of $\vec{\omega}_{is}^s$, $\vec{\alpha}$ represents the included angle vector between $\vec{\omega}_\theta$ and $\vec{\omega}_{is}^s$, $T(\vec{\alpha})$ represents the transformation matrix from $\vec{\omega}_\theta$ to $\vec{\omega}_{is}^s$, $$\vec{\alpha} = \frac{\pi}{2}U - \Delta\vec{\phi},$$

wherein $U=[1\ 1\ 1]^T$, and:

$$A(\vec{\omega}_\theta) = \begin{bmatrix} |\omega_{\theta_x}| & 0 & 0 \\ 0 & |\omega_{\theta_y}| & 0 \\ 0 & 0 & |\omega_{\theta_z}| \end{bmatrix}$$

$$\vec{u}_{is}^s = \frac{\vec{\omega}_{is}^s}{|\vec{\omega}_{is}^s|}$$

$$T(\vec{\alpha}) = I - \left[\left(\frac{\pi}{2}U - \Delta\vec{\phi}\right)\times\right]$$

The symbol $\|$ represents modulus operation, $\vec{\omega}_\theta$ is substituted into the expression of $\Delta\vec{\omega}$, then:

$$\Delta\vec{\omega} = A(\vec{\omega}_\theta)T(\vec{\alpha})\vec{\mu}_{is}^s - [(\vec{\varphi}+\Delta\vec{\varphi})\times]\vec{\omega}_{im}^m.$$

$T(\vec{\alpha})$ is substituted into the expression of $\Delta\vec{\omega}$, then:

$$\Delta\vec{\omega} = (\vec{\omega}_{im}^m\times)\vec{\varphi} + (\vec{\omega}_{im}^m\times)\Delta\vec{\phi} + A(\vec{\omega}_\theta)\vec{u}_{is}^s - A(\vec{\omega}_\theta)\left[\left(\frac{\pi}{2}U - \Delta\vec{\phi}\right)\times\right]\vec{u}_{is}^s.$$

Figure 4:
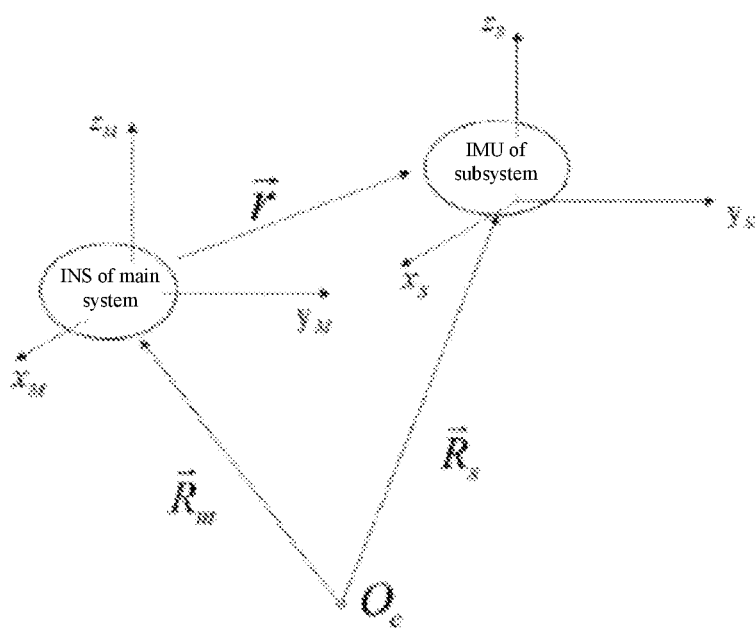
FIG. 4 is a schematic diagram of the relative position relationship between the main system and the subsystems.

The positional relationship between the main system and the subsystem is shown in FIG. 4, and is expressed as:

$$\vec{R}_s = \vec{R}_m + \vec{r},$$

wherein, $\vec{R}_m$ and $\vec{R}_s$ represent the vector of main node or subnode to the earth core respectively, $\vec{r}$ represents the dynamic lever arm vector between the main node and the subnode, and the following expression is obtained in the inertial system:

$$\vec{R}_s^i = \vec{R}_m^i + C_m^i(\vec{\omega}_{im}^m\times)(\vec{\omega}_{im}^m\times)\vec{r}^m + C_m^i(\vec{\omega}_{im}^m\times)\vec{r}^m + C_m^i(\vec{\omega}_{im}^m\times)\dot{\vec{r}}_m + C_m^i(\vec{\omega}_{im}^m\times)\dot{\vec{r}}_m + C_m^i\ddot{\vec{r}}_m$$

wherein, $C_m^i$ represents the transformation matrix from the main system to the inertial system, $\vec{r}^m$ represents the dynamic lever arm vector in the coordinate system of the main system; according to Newton's second law:

$$\ddot{\vec{R}}_s^i = f_s^i + g_s^i + \vec{\omega}_{ie}^i\times(\vec{\omega}_{ie}^i\times\vec{R}_s^i)$$

$$\ddot{\vec{R}}_m^i = f_m^i + g_m^i + \vec{\omega}_{ie}^i\times(\vec{\omega}_{ie}^i\times\vec{R}_m^i),$$

wherein, $f_s^i$ represents the specific force of the subsystem in the inertial system, $f_m^i$ represents the specific force of the main system in the inertial system, g represents gravitational acceleration, and $\vec{\omega}_{ie}^i$ represents the rotational angular speed of earth, then:

$$f_s^i = f_m^i + C_m^i(\vec{\omega}_{im}^m\times)(\vec{\omega}_{im}^m\times)\vec{r}^m + C_m^i(\vec{\omega}_{im}^m\times)\vec{r}^m + C_m^i(\vec{\omega}_{im}^m\times)\dot{\vec{r}}^m + C_m^i(\vec{\omega}_{im}^m\times)\dot{\vec{r}}^m + C_m\ddot{\vec{r}}_m$$

Since the differential equations of speed vector of the main system and subsystem can be expressed as follows:

$$\dot{\vec{v}}_m^n = C_m^n f_m^n - (2\vec{\omega}_{ie}^n + \vec{\omega}_{en}^n)\times\vec{v}_m^n + g^n$$

$$\dot{\vec{v}}_s^n = C_m^n C_s^m(f_s^s + \vec{\nabla}^s) - (2\vec{\omega}_{ie}^n + \vec{\omega}_{en}^n)\times\vec{v}_s^n + g^s,$$

wherein, $\vec{v}_m^n$ and $\vec{v}_s^n$ represent the speed vectors of the main system and the subsystem in the navigation coordinate system respectively, $\vec{\omega}_{ie}^n$ represents the rotation of the navigation system caused by the rotation of the earth, $\vec{\omega}_{en}^n$ represents the rotation of the navigation system caused by the curvature of the surface of the earth as the subsystem moves on the surface of the earth, $\vec{\omega}_{im}^n$ represents the angular speed of the main system in the navigation system, $f_s^n$ represents the specific force of the subsystem in the navigation coordinate system, $\vec{\nabla}^s$ represents the zero bias of the accelerometer measurement of the subsystem, the speed error vector equation is expressed as:

$$\delta\vec{v} = \vec{v}_s^n - \vec{v}_m^n.$$

Through differential treatment of the two sides of the above equation, the following equation is obtained:

$$\delta\dot{\vec{v}} = -(2\vec{\omega}_{ie}^n + \vec{\omega}_{en}^n)\times\delta\vec{v} + [(\vec{\omega}_{im}^n\times)(\vec{\omega}_{im}^n\times) + (\dot{\vec{\omega}}_{im}^n\times)]\vec{r}^n + 2(\vec{\omega}_{im}^n\times)\dot{\vec{r}}^n + \ddot{\vec{r}}^n + C_s^n\vec{\nabla}^s + (f_s^n\times)\Delta\vec{\phi}.$$

The dynamic lever arm vector may be expressed as:

$$\vec{r} = \vec{r}_0 + \delta\vec{r}$$

$$\delta\vec{r} = R_0(\vec{\varphi} + \Delta\vec{\phi}),$$

wherein, $\vec{r}_0 = [x_0\ y_0\ z_0]^T$ represents the static lever arm, $x_0\ y_0\ z_0$ represent the static lever arm in east, north, and up directions respectively, $$R = \begin{bmatrix} 0 & z_0 & 0 \\ 0 & 0 & x_0 \\ y_0 & 0 & 0 \end{bmatrix};$$

through differential treatment of the two sides of the above equation, the following equations are obtained:

$$\dot{\vec{r}} = \delta\dot{\vec{r}} = R_0(\dot{\vec{\theta}} + \Delta\dot{\vec{\phi}})$$

$$\ddot{\vec{r}} = R_0(\ddot{\vec{\theta}} + \Delta\ddot{\vec{\phi}}) = R_0 B_1\ddot{\vec{\theta}} + R_0 B_2\dot{\vec{\theta}} + R_0\Delta\ddot{\vec{\phi}}.$$

The expression of the dynamic lever arm is substituted into the speed error vector expression, then:

$$\delta\dot{\vec{v}} = -(2\vec{\omega}_{ie}^n + \vec{\omega}_{en}^n)\times\delta\vec{v} + R_0 B_2\dot{\vec{\theta}} + (2(\vec{\omega}_{im}^n\times)R_0 + R_0 B_1)\dot{\vec{\theta}} + C_s^n\vec{\nabla}^s + R_0\Delta\ddot{\vec{\phi}} + [(\vec{\omega}_{im}^n\times)(\vec{\omega}_{im}^n\times) + (\dot{\vec{\omega}}_{im}^n\times)]\delta\vec{r} + (f_s^n\times)\Delta\vec{\phi} + [(\vec{\omega}_{im}^n\times)(\vec{\omega}_{im}^n\times) + (\dot{\vec{\omega}}_{im}^n\times)]\vec{r}_0.$$

Step 4: adopting "speed+angular speed" matching method for the transfer alignment filter 2, establishing a measurement quantity equation by using the expression of speed error and expression of angular speed error derived in step 3, establishing a Kalman filter model, estimating the initial attitude error of the subnodes, and using this error for initial attitude calibration of the subnodes, so as to accomplish a transfer alignment process.

In this step, the state quantities of the filter 2 are selected as follows:

$$x_2 = [\delta \vec{v} \; \vec{\nabla}^s \; \vec{\theta} \; \vec{\dot{\theta}} \; \delta \vec{r}]^T,$$

wherein, $\delta \vec{v}$ represents the speed error, and $\vec{\nabla}^s$ represents the zero bias of accelerometer measurement of the subsystem;

The state equation of the filter is:

$$\dot{x}_2 = F_2 x_2 + G_2 w_2,$$

wherein, $G_2$ represents the system noise distribution matrix of filter 2, $w_2$ represents the system noise of filter 2, and $F_2$ is expressed as:

$$F_2 = \begin{bmatrix} F_{11} & C_3^n & F_{13} & F_{14} & F_{15} \\ 0_{3\times3} & 0_{3\times3} & 0_{3\times3} & 0_{3\times3} & 0_{3\times3} \\ 0_{3\times3} & 0_{3\times3} & 0_{3\times3} & I_{3\times3} & 0_{3\times3} \\ 0_{3\times3} & 0_{3\times3} & B_1 & B_2 & 0_{3\times3} \\ 0_{3\times3} & 0_{3\times3} & F_{53} & F_{54} & 0_{3\times3} \end{bmatrix},$$

wherein, $$F_{11} = -[(2\vec{\omega}_{ie}^n + \vec{\omega}_{en}^n) \times], \; F_{13} = R_0 B_2 + R_0 M(B_1 B_2 + B_2),$$
$$F_{14} = (2(\vec{\omega}_{im}^n) R_0 + R_0 B_1) + R_0 M B_1^2, \; F_{15} =$$
$$[(\vec{\omega}_{im}^n \times)(\vec{\omega}_{im}^n \times) + (\vec{\omega}_{im}^n \times)], \; F_{53} = R_0 M B_2,$$
$$F_{54} = R_0 + R_0 M B_1,$$

and the system measurement equation is as follows:

$$y_2 = H_2 x_2 + \mu_2,$$

wherein, $y_2$ represents the difference between the true value of speed or angular speed and the estimated value from the filter, $\mu_2$ represents the measurement noise in the filter 2, and $$H_2 = \begin{bmatrix} I_{3\times3} & 0_{3\times3} & 0_{3\times3} & 0_{3\times3} & 0_{3\times3} \\ 0_{3\times3} & 0_{3\times3} & (\vec{\omega}_{im}^m \times) & I_{3\times3} & 0_{3\times3} \end{bmatrix}.$$

The invention claimed is:

1. A dual-filter-based transfer alignment method under dynamic deformation, applied to an aircraft wing deformation measurement system, in which a main inertial navigation system is installed in a cabin and inertial navigation subsystems are installed on the wings, wherein the method comprises the following steps:

generating attitude, speed and position information of the main inertial navigation system and outputs of a gyro and an accelerometer by using a trajectory generator, simulating flexural deformation angle $\vec{\theta}$ and flexural deformation angular speed $\vec{\dot{\theta}}$ between the main inertial navigation system and the inertial navigation subsystems by using a second-order Markov, carrying out geometric analysis on the flexural deformation, and deriving an expression of coupling angle $\Delta\vec{\phi}$ resulted from dynamic deformation of the carrier and movement of the carrier;

using the flexural deformation angle, the flexural deformation angular speed and the coupling angle as state quantities, and establishing a model of filter 1 with an attitude matching method;

establishing a dynamic lever arm model by using the flexural deformation angle and the coupling angle estimated in step (2), and deriving an expression of speed error and an expression of angular speed error;

establishing a model of filter 2 by using the expression of speed error and expression of angular speed error derived in step (3) with a "speed+angular speed" matching method, estimating the initial attitude error of the inertial navigation subsystems, and using this error for initial attitude calibration of the inertial navigation subsystems, so as to accomplish a transfer alignment process.

2. The dual-filter-based transfer alignment method under dynamic deformation according to claim 1, wherein in step (1), the geometrical analysis on the flexural deformation is carried out and the expression of coupling angle $\Delta\vec{\phi}$ resulted from the dynamic deformation of the carrier and movement of the carrier is derived as follows:

$$\Delta\vec{\phi} = M \vec{\omega}_\theta,$$

wherein, $\vec{\omega}_\theta = \vec{\dot{\theta}}$, and M is expressed as:

$$M = \begin{bmatrix} 0 & 0 & -\dfrac{1}{\omega_{isy}^{s'}} \\ -\dfrac{1}{\omega_{isz}^{s'}} & 0 & 0 \\ 0 & -\dfrac{1}{\omega_{isx}^{s'}} & 0 \end{bmatrix},$$

wherein, $\omega_{isx}^{s'}$, $\omega_{isy}^{s'}$ and $\omega_{isz}^{s'}$ represent the ideal angular speeds of the inertial navigation subsystems in east, north, and sky directions respectively.

3. The dual-filter-based transfer alignment method under dynamic deformation according to claim 2, wherein in step (2), the flexural deformation angle, the flexural deformation angular speed and the coupling angle are used as state quantities and the model of filter 1 is established with an attitude matching method as follows:

the state quantities of the filter 1 are selected as follows:

$$x_1 = [\delta\vec{\phi} \; \vec{\epsilon}^s \; \vec{\rho}_0 \; \vec{\theta} \; \vec{\dot{\theta}} \; \Delta\vec{\phi}]^T,$$

wherein, $\delta\vec{\phi}$ represents attitude error, $\vec{\epsilon}^s$ represents zero drift of gyro measurement in the subsystem, and $\vec{\rho}_0$ represents initial installation angle error between the main system and the subsystem;

the state equation of filter 1 is:

$$\dot{x}_1 = F_1 x_1 + G_1 w_1,$$

wherein, $F_1$ represents the state transition matrix of filter 1, $G_1$ represents the system noise distribution matrix of filter 1, $w_1$ represents the system noise of filter 1, the state transition matrix $F_1$ is expressed as:

$$F_1 = \begin{bmatrix} (-\vec{\omega}_{in}^n \times) & -C_{s'}^n & 0_{3\times3} & 0_{3\times3} & 0_{3\times3} & 0_{3\times3} \\ 0_{3\times3} & 0_{3\times3} & 0_{3\times3} & 0_{3\times3} & 0_{3\times3} & 0_{3\times3} \\ 0_{3\times3} & 0_{3\times3} & 0_{3\times3} & 0_{3\times3} & 0_{3\times3} & 0_{3\times3} \\ 0_{3\times3} & 0_{3\times3} & 0_{3\times3} & 0_{3\times3} & I_{3\times3} & 0_{3\times3} \\ 0_{3\times3} & 0_{3\times3} & 0_{3\times3} & B_1 & B_2 & 0_{3\times3} \\ 0_{3\times3} & 0_{3\times3} & 0_{3\times3} & F_{64} & F_{65} & 0_{3\times3} \end{bmatrix},$$

wherein, $\vec{\omega}_{in}^n$ represents the rotation of the navigation system with respect to the inertial system, $\vec{\omega}_{in}^n \times$ represents an antisymmetric matrix, $C_s^n$, represents a transformation matrix between the ideal coordinate system of the subsystem and the navigation coordinate system, and $$B_1 = \begin{bmatrix} 0 & -2\beta_y & 0 \\ 0 & 0 & -2\beta_z \\ -2\beta_x & 0 & 0 \end{bmatrix}$$

$$B_2 = \begin{bmatrix} 0 & -\beta_y^2 & 0 \\ 0 & 0 & -\beta_z^2 \\ -\beta_x^2 & 0 & 0 \end{bmatrix},$$

$\beta_i(i=x,y,x)$ represent the coefficients of the second-order Markov model in east, north, and sky directions, $F_{64}=MB_2$, $F_{65}=MB_1$;

the system measurement equation is:

$$y_1 = H_1 x_1 + \mu_1,$$

wherein, $y_1$ represents the difference between the true value of attitude and the estimated value from the filter, $H_1$ represents the measurement matrix of the filter 1, and $\mu_1$ represents the measurement noise in the filter 1.

4. The dual-filter-based transfer alignment method under dynamic deformation according to claim 2, wherein the expression of speed error and the expression of angular speed error are derived in step (3) as follows:

the expression of angular speed error is as follows:

$$\Delta\vec{\omega} = (\vec{\omega}_{im}^m \times)\vec{\varphi} + (\vec{\omega}_{im}^m \times)\Delta\vec{\phi} + A(\vec{\omega}_\theta)\vec{u}_{is}^s - A(\vec{\omega}_\theta)\left[\left(\frac{\pi}{2}U - \Delta\vec{\phi}\right)\times\right]\vec{u}_{is}^s,$$

wherein, $\vec{\omega}_{im}^m$ represents the angular speed of the main system in the coordinate system of the main system, $\vec{\varphi}$ represents the ideal error angle between the main system and the subsystem, $A(\vec{\omega}_\theta)$ represent an amplitude matrix, $\vec{u}_{is}^s$ represents the identity matrix in the direction of $\vec{\omega}_{is}^s$, and $\vec{\omega}_{is}^s$ represents the angular speed of the subsystem under the coordinate system of the subsystem, $U=[1\ 1\ 1]^T$;

the expression of speed error is as follows:

$$\delta\dot{\vec{v}} = -(2\vec{\omega}_{ie}^n + \vec{\omega}_{en}^n) \times \delta\vec{v} + R_0 B_2 \vec{\theta} + (2(\vec{\omega}_{im}^n \times)R_0 + R_0 B_1)\dot{\vec{\theta}} + C_s^n \vec{\nabla}^s + R_0 \Delta\vec{\phi} + \left[(\vec{\omega}_{im}^n \times)(\vec{\omega}_{im}^n \times) + (\dot{\vec{\omega}}_{im}^n \times)\right]\delta\vec{r} + (f_s^n \times)\Delta\vec{\phi} + \left[(\vec{\omega}_{im}^n \times)(\vec{\omega}_{im}^n \times) + (\dot{\vec{\omega}}_{im}^n \times)\right]\vec{r}_0,$$

wherein, $\vec{\omega}_{ie}^n$ represents the rotation of the navigation system caused by the rotation of the earth, $\vec{\omega}_{en}^n$ represents the rotation of the navigation system caused by the curvature of the surface of the earth as the subsystem moves on the surface of the earth, $\delta\vec{v} = \vec{v}_s^n - \vec{v}_m^n$, $\vec{v}_m^n$ and $\vec{v}_s^n$ represent the speed vectors of the main system and the subsystem in the navigation coordinate system, $\vec{\theta}$ represents the flexural deformation angle between the main inertial navigation system and the inertial navigation subsystem, $\Delta\vec{\phi}$ represents the coupling angle between the main inertial navigation system and the inertial navigation subsystem, $\vec{\omega}_{im}^n$ represents the angular speed of the main system in the navigation system, $C_s^n$ represents the transformation matrix between the subsystem and the navigation coordinate system, $\vec{\nabla}^s$ represents the zero drift of accelerometer measurement of the subsystem, $f_s^n$ represents the specific force of the subsystem in the navigation coordinate system, $\delta\vec{r}$ represents dynamic lever arm, $\vec{r}_0 = [x_0\ y_0\ z_0]^T$ represents static lever arm, $x_0\ y_0\ z_0$ represent static lever arms in east, north, and sky directions respectively, and $R_0$ can be expressed as:

$$R_0 = \begin{bmatrix} 0 & z_0 & 0 \\ 0 & 0 & x_0 \\ y_0 & 0 & 0 \end{bmatrix}.$$

5. The dual-filter-based transfer alignment method under dynamic deformation according to claim 4, wherein in step (4), the model of filter 2 is established with a "speed+angular speed" matching method, the equation of measurement quantities is established by using the expression of speed error and the expression of angular speed error derived in step (3), and a Kalman filter model is established as follows:

the state quantities of the Kalman filter 2 are selected as follows:

$$x_2 = [\delta\vec{v}\ \vec{\nabla}^s\ \vec{\theta}\ \dot{\vec{\theta}}\ \delta\vec{r}]^T,$$

wherein, $\delta\vec{v}$ represents the speed error, and $\vec{\nabla}^s$ represents the zero drift of accelerometer measurement of the subsystem;

the state equation of the filter is:

$$\dot{x}_2 = F_2 x_2 + G_2 w_2,$$

wherein, $G_2$ represents the system noise distribution matrix of filter 2, $w_2$ represents the system noise of filter 2, and the state transition matrix $F_2$ is expressed as:

$$F_2 = \begin{bmatrix} F_{11} & C_s^n & F_{13} & F_{14} & F_{15} \\ 0_{3\times3} & 0_{3\times3} & 0_{3\times3} & 0_{3\times3} & 0_{3\times3} \\ 0_{3\times3} & 0_{3\times3} & 0_{3\times3} & I_{3\times3} & 0_{3\times3} \\ 0_{3\times3} & 0_{3\times3} & B_1 & B_2 & 0_{3\times3} \\ 0_{3\times3} & 0_{3\times3} & F_{53} & F_{54} & 0_{3\times3} \end{bmatrix},$$

wherein, $F_{11} = -[(2\vec{\omega}_{ie}^n + \vec{\omega}_{en}^n)\times]$, $F_{13} = R_0 B_2 + R_0 M(B_1 B_2 + B_2)$,
$F_{14} = (2(\vec{\omega}_{im}^n)R_0 + R_0 B_1) + R_0 M B_1^2$, $F_{15} = [(\vec{\omega}_{im}^n \times)(\vec{\omega}_{im}^n \times) + (\dot{\vec{\omega}}_{im}^n \times)]$, $F_{53} = R_0 M B_2$,
$F_{54} = R_0 + R_0 M B_1$, and the system measurement equation is as follows:

$y_2 = H_2 x_2 + \mu_2,$ wherein, $y_2$ represents the difference between the true value of speed or angular speed and the estimated value from the filter, $\mu_2$ represents the measurement noise in the filter 2, and $$H_2 = \begin{bmatrix} I_{3\times 3} & 0_{3\times 3} & 0_{3\times 3} & 0_{3\times 3} & 0_{3\times 3} \\ 0_{3\times 3} & 0_{3\times 3} & (\vec{\omega}_{im}^n \times) & I_{3\times 3} & 0_{3\times 3} \end{bmatrix}.$$

\* \* \* \* \*